United States Patent [19]

Arai

[11] 4,328,717
[45] May 11, 1982

[54] AUTOMATIC TRANSMISSION

[75] Inventor: Hajime Arai, Aichi, Japan

[73] Assignee: Toyota Jidosha Kogyo Kabushiki Kaisha, Toyota, Japan

[21] Appl. No.: 31,744

[22] Filed: Apr. 20, 1979

[30] Foreign Application Priority Data

Nov. 6, 1978 [JP] Japan ............... 53-136426

[51] Int. Cl.³ .............. F16H 57/10; F16H 3/44
[52] U.S. Cl. ........................ 74/760; 74/786; 74/787
[58] Field of Search ............ 74/760, 761, 786, 787

[56] References Cited

U.S. PATENT DOCUMENTS

| | | | |
|---|---|---|---|
| 2,406,225 | 8/1946 | Kelbel | 74/761 |
| 2,598,179 | 5/1952 | Kelbel | 74/761 |
| 2,606,459 | 8/1952 | Carnegie | 74/761 X |
| 2,853,890 | 9/1958 | Kelbel | 74/761 X |
| 2,947,199 | 8/1960 | Doidge et al. | 74/761 X |
| 3,003,368 | 10/1961 | Winchell | 74/752 C |
| 3,017,788 | 1/1962 | Polomski | 74/752 C X |
| 3,030,824 | 4/1962 | Moore | 74/761 X |
| 3,188,885 | 6/1965 | Fisher | 74/761 X |
| 3,592,082 | 7/1971 | Ott | 74/761 |
| 3,600,975 | 8/1971 | Ott | 74/761 |

FOREIGN PATENT DOCUMENTS

| | | | |
|---|---|---|---|
| 2608695 | 9/1977 | Fed. Rep. of Germany | 74/761 |
| 986069 | 3/1956 | United Kingdom | 74/761 |
| 1010931 | 11/1965 | United Kingdom | 74/761 |

Primary Examiner—Leslie Braun
Attorney, Agent, or Firm—Finnegan, Henderson, Farabow, Garrett & Dunner

[57] ABSTRACT

An automatic transmission which establishes the first forward speed stage and the reverse stage by selective stopping of rotary elements of a Ravigneaux type planetary gear train effected by mechanical brakes and which establishes the second forward speed or direct connection stage by coupling two relatively rotating elements of the planetary gear train by means of an oil pressure clutch so as to lock the planetary gear train.

2 Claims, 7 Drawing Figures

AUTOMATIC TRANSMISSION

BACKGROUND OF THE INVENTION

The present invention relates to the field of automatic transmissions, and more particularly relates to an automatic transmission which is suitable for use with power sources which have a zero idling speed. In particular, the present invention relates to an automatic transmission suitable for use with vehicles powered with rotary electric motors.

In general, the torque and revolution speed characteristics of an electric motor are better matched with the load characteristics of a vehicle than are those of an internal combustion engine such as a gasoline or a diesel engine. In the case of a railway engine, normally, no changing of gear ratios is necessary for the effective coupling of an electric motor to the wheels, but in the case of an electric automobile the driving and running conditions change over such a relatively wider range, as compared with a railway engine, that changes are required in delivered revolution speed and torque greater than those of which the power source is capable, and therefore a gear changing mechanism or gearbox is required in the transmission of such an electric automobile. For this reason, even in conventional electric cars, an ordinary pedal operated clutch and manual transmission has been used, rather as in a car using a normal internal combustion engine as a power source. Further, it is of course possible to incorporate in an electric car a normal automatic transmission as fitted to a car provided with a normal internal combustion engine power source. However, since for an electric power source there is no need for the power source to idle at a certain non-zero idling speed when the vehicle is temporarily stopped, it is necessary to provide operating oil pressure to the automatic transmission by an auxiliary electric pump or other power source which is kept in operation while the vehicle is temporarily at a standstill. This is expensive, unreliable, and inefficient.

Further, it is to be noted that, because of the good characteristics of an electric motor with regard to torque and revolution speed, it is not normally necessary to provide more than two forward speed stages for an automatic transmission, as opposed to the case of internal combustion engine, in which normally a minimum of three forward speed stages are desirable.

SUMMARY OF THE INVENTION

Therefore, it is an object of the present invention to provide an automatic transmission for use in a vehicle powered with a rotary electric motor, which overcomes the problems described above which would occur when a conventional automatic transmission was used in an electric powered vehicle, and which thus eliminates the need for an auxiliary source of oil pressure operated by an electric pump or the like which keeps the transmission operating while the vehicle is at rest, and which further achieves automatic forward speed changing between two forward speeds according to the operating conditions of the vehicle.

This object is attained according to the present invention by a transmission comprising a casing, an input shaft, an output shaft, an oil pump, a Ravigneaux type planetary gear train comprising first and second sun gears, first and second planetary pinions meshed respectively with the first and second sun gears, and also mutually meshed, a carrier supporting the first and second planetary pinions, and a ring gear meshed with the second planetary pinion, an oil pressure clutch operated by the oil pressure output from the oil pump, a one way clutch, and first and second mechanical brakes, wherein the input shaft and the output shaft are respectively coupled to the first sun gear and the carrier, the second sun gear is coupled to the casing through the one way clutch and the first mechanical brake, and is also coupled to the input shaft through the oil pressure clutch, and the ring gear is coupled to the casing through the second mechanical brake.

BRIEF DESCRIPTION OF THE DRAWINGS

The present invention will now be described in more detail with respect to some preferred embodiments thereof, and with respect to the appended drawings, which, however, are not intended to be in any way limitative of the present invention, but are given for the purposes of illustration only. In the drawings, like reference numerals refer to like parts of the different figures, and.

DESCRIPTION OF THE PREFERRED EMBODIMENTS

Figure 1:
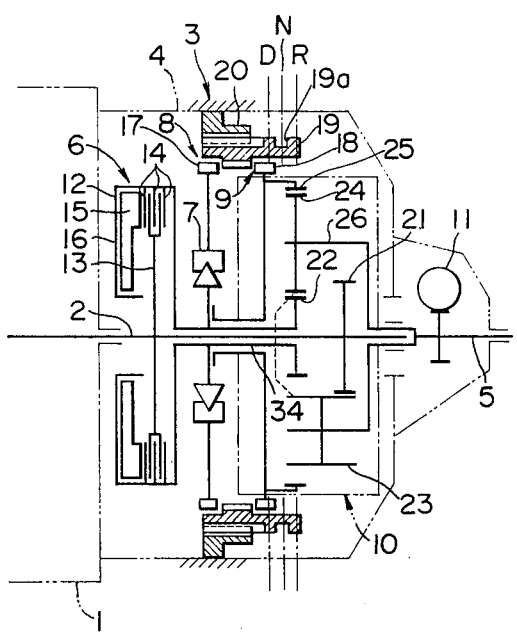
FIG. 1 is a rather generalized or schematic sectional view along the power axis of a transmission according to the present invention, wherein various operating parts are shown as line drawings only, for the purposes of explanation.

Referring to the drawings, 1 designates an electric motor which drives a vehicle, and 2 is its output shaft, which is also the input shaft to the transmission, which is a particular embodiment of the present invention, and which is generally designated by 3. This transmission 3 has a casing 4, and opposed to the input shaft 2 it has an output shaft 5. Within the casing 4 are included an oil pressure clutch 6, a one way clutch 7, first and second mechanical brakes denoted by 8 and 9 respectively, a Ravigneaux planetary gear train 10, and an oil pump 11 driven by the output shaft 5. It is to be noted that the oil pump 11 may be driven by the input shaft 2, as an alternative.

The oil pressure clutch 6 includes a clutch housing 12, a clutch disk 13, an annular friction element 14, a piston 15, and a cylinder 16. The construction is such that, when oil pressure is supplied to the cylinder 16, the oil pressure clutch 6 engages frictionally between the clutch housing 12 and the clutch disk 13.

The first and second mechanical brakes 8 and 9 are made up of splined wheels 17 and 18 respectively, and also of a shift element 19 which has teeth which selectively engage with these splined wheels. This shift element is slidably mounted within a shift element guide member 20 fixed to the casing 4. The shift element 19 can be slid along the shift element guide member 20 to a position where its teeth engage with the spline wheel 17, a position where its teeth engage with the spline wheel 18, and also to an intermediate position where its teeth do not engage with either of the spline wheels. A groove 19a is provided in the shift element 19 and into this groove 19a is engaged an operating manual shift lever not shown in the figures. By the operation of this operating manual shift lever the shift element 19 may be shifted between the three positions by the shift element groove: with the operating manual shift lever in the neutral (N) position, the shift element 19 is in its central position, with its teeth not engaged with either spline wheel, and in the drive (D) and reverse (R) positions the shift element 19 is in its forwards and reverse engagement positions, respectively, with its teeth engaged with the spline wheel 17 or 18 respectively, so as to stop this respective spline wheel from rotating relative to the housing 4.

Figure 2:
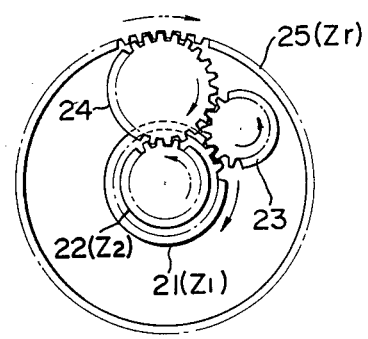
FIG. 2 is a schematic end view of the gear wheels of a Ravigneaux type planetary gear mechanism used in the transmission of FIG. 1, to show their directions of rotation and their mutual meshing.

The Ravigneaux type planetary gear train 10 is provided with a first sun gear 21, a second sun gear 22, a first planetary pinion 23, a second planetary pinion 24, a ring gear 25 and a carrier 26. As shown in FIG. 2, the first and second planetary pinions 23 and 24 mesh respectively with the first and the second sun gears 21 and 22, and the planetary pinions 23 and 24 are also mutually meshed. The second planetary pinion 24, only, meshes with the ring gear 25. The first and second planetary pinions 23 and 24 are supported together by the carrier 26.

The transmission input shaft 2 is coupled to the clutch disk 13 of the oil pressure clutch 6, and is also coupled to the first sun gear 21 of the Ravigneaux type planetary gear train 10. The second sun gear 22 of the Ravigneaux type planetary gear train 10 is coupled, via an intermediate shaft 34, to the clutch housing 12 of the oil pressure clutch 6, and is also coupled through the intermediate shaft 34 and the one way clutch 7 to the spline wheel 17. The ring gear 25 is coupled to the spline wheel 18. The carrier 26 is coupled to the output shaft 5.

The transmission described above works in the following manner.

Firstly, suppose that the shift element 19 is in the neutral position, i.e. "N" position, and that the vehicle is stopped. Therefore the output shaft 5 is stationary, so that in this state the oil pump 11 does not generate any oil pressure. Therefore, the clutch 6 is in the disengaged state. Furthermore, as the first and the second mechanical brakes 8 and 9 are neither of them engaged, even if the input shaft 2 is driven, as by the electric motor 1 accidentally or deliberately being energized, the Ravigneaux type planetary gear train 10 will race freely, and there will be no drive transmission from the input shaft 2 to the output shaft 5, and hence the vehicle will not be propelled.

Assume that, now, the electric motor 1 is not energized, and that the shift element 19 is shifted by operation of the operating manual shift lever into the drive position, i.e. the "D" position, which is to the left in FIG. 1, where the mechanical brake 8 is engaged. Then, suppose that power is supplied to the electric motor 1 to drive the vehicle. The electric motor 1 drives the input shaft 2. Thereupon, the first sun gear 21, which is coupled to the the input shaft 2, turns, for example, in a clockwise direction as seen in FIG. 2, as indicated by the solid arrow. The first planetary pinion 23 is driven by this rotation of the first sun gear 21, with which it is meshed, in an anticlockwise direction, as shown by an arrow in FIG. 2. This first planetary pinion 23 then drives the second planetary pinion 24, with which it is meshed, in a clockwise direction, as shown by an arrow in FIG. 2. The ring gear 25 is free to turn, since the mechanical brake 9 is not engaged. The second sun gear 22, which is meshed with the planetary pinion 24, which is, as explained above, turning clockwise, is urged thereby in an anticlockwise direction as seen in FIG. 2 as denoted therein by a dotted arrow, but it is unable to move in this anticlockwise direction, because it is fixed with respect to the casing 4 by the one way clutch 7 and the mechanical brake 8 by way of the shaft 34. Therefore, this second sun gear 22 cannot turn in the direction of the dotted arrow, and as a reaction to this the carrier 26 on which the planetary pinions 23 and 24 are mounted is driven as a whole in the opposite direction, in the clockwise direction as shown in FIG. 2. By this the output shaft 5, which is coupled to this carrier 26, is driven in the direction appropriate to make the vehicle move in the forward direction.

In this case the speed reduction ratio between the input shaft 2 and the output shaft 5 is $(Z1+Z2)/Z1$, where $Z1$ and $Z2$ represent the number of teeth on the first and the second sun gears 21 and 22, respectively.

Therefore the vehicle moves away from rest. It is to be noted that, because the motor 1 is an electric motor, there is no need for a torque converter as provided in vehicles which are driven by internal combustion engines, owing to the advantageous torque characteristics of an electric motor. Nor of course is there any need for any kind of fluid clutch. Further, it is to be noted that, during this moving-off operation, no oil pressure from the oil pump 11 is required.

According to driving conditions, therefore, the speed of the vehicle, and hence the rotational speed of the output shaft 5, will increase. At a certain speed, determined by the relation between motor speed, output shaft speed, and accelerator pedal position, where better driving characteristics and higher efficiency may be attained by changing to a higher gear ratio in the transmission, an oil pressure regulation device feeds oil pressure from the oil pump 11 to the cylinder 16 of the oil pressure clutch 6, so that the oil pressure clutch 6 engages. The details of this oil pressure regulation device are not shown particularly in the drawing, or described here, because they are matters of ordinary construction, to one skilled in the transmission art. When the oil pressure clutch 6 engages, the input shaft 2 is now directly connected to both the first and the second sun gears 21 and 22: to the first sun gear 21 directly, and to the second sun gear 22 via the clutch disk 13, the annular friction element 14, the oil pressure clutch housing 12, and the intermediate shaft 34. In this condition, since therefore the two sun gears 21 and 22 are locked together, the entire Ravigneaux planetary gear train locks up and performs no speed reduction function, and the transmission becomes a direct transmission, transmitting power directly from the input shaft 2 to the output shaft 5 without any speed reduction.

It is to be noted that the changeover from first speed stage, when speed reduction between the input and the output shaft is being performed, to the direct drive stage, in contradistinction to the initial engagement of said first speed stage, and moving off from rest, requires oil pressure. However, such oil pressure will be available when the vehicle is moving, whether the oil pump is coupled to the output shaft of the transmission, or to the input shaft. That is to say, the oil pressure is needed, only when it is available.

Suppose now that it is desired to operate the vehicle in the backwards driving mode. First, naturally, the vehicle is brought to rest, and the electric motor 1 is de-energized. Thus the rotational velocity of both the input shaft 2 and the output shaft 5 is zero. Then the shift element 19 is shifted, by operation of the operating manual shift lever, to the reverse, or "R," position, which is to the right hand side in the figure, and thereby its teeth engage the teeth of the second spline wheel 18, and thus the second mechanical brake 9 is engaged, whereby the ring gear 25 of the Ravigneaux planetary gear train 10 is fixed with respect to the housing 4. Further, of course, the first mechanical brake 8 is free. In this state, when the electric motor 1 is energized, the input shaft 2 is driven in a clockwise direction, as before, as shown by the solid arrow in FIG. 2. Therefore the sun gear 21 is driven clockwise, and therefore the planetary pinion 23, with which this sun gear 21 is engaged, is driven in an anticlockwise direction, as shown by the solid arrow in FIG. 2. Thereby, the second planetary pinion 24, which meshes with this first planetary pinion 23, is driven in a clockwise direction, again as shown by the solid arrow in FIG. 2. This rotation of the second planetary pinion 24 in a clockwise direction urges the ring gear 25 in a clockwise direction, as shown by the dotted arrow in FIG. 2, but, since this ring gear is positively prevented from moving with respect to the housing 4 by the engagement of the mechanical brake 9, by the reaction on the carrier 26, this carrier 26 is driven in the anticlockwise direction as seen in FIG. 2. In other words, the output shaft 5, which is coupled to this carrier 26, is therefore driven in the opposite direction to that of the input shaft 2, and this is the direction which propels the vehicle backwards. Thus reverse driving mode operation is accomplished.

In this case, if Zr represents the number of teeth on the ring gear 25, the speed reduction ratio between the input shaft 2 and the output shaft 5 is $(Zr-Z1)/Z1$.

Further, it is to be noticed that the operation of engagement of reverse gear, like the operation of engagement of forward driving gear, does not involve any supply of oil pressure from the oil pump 11. Nor does the moving off in reverse involve any operation of a fluid torque converter, or of a fluid clutch. In fact, the supply of oil pressure from the oil pump 11 is only needed for the change from first speed stage, wherein speed reduction is accomplished by the Ravigneaux planetary gear train 10, to direct driving stage. Thus, as contrasted to the operation of conventional automatic transmissions, there is no disadvantage in the habitual de-energizing of the engine, whenever the vehicle comes to rest, and the loss of oil pressure thereby occasioned does not cause any difficulty with regard to the operation of the automatic transmission. This is the reason that the transmission according to the present invention is particularly suited for use in a vehicle which is driven by an electric motor.

Figure 3:
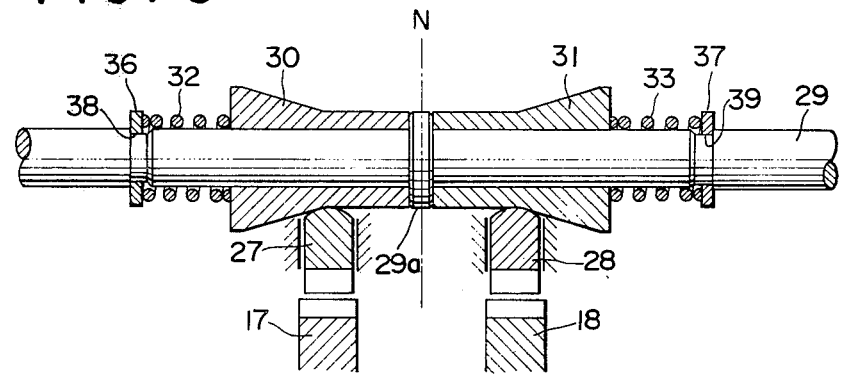
FIGS. 3, 4, and 5 are views of part of the mechanical brakes of a second embodiment of the present invention, taken in section by a plane which contains the power axis of the transmission, said figures showing the positions of the brakes when the transmission is in, respectively, the neutral or "N" operating mode, the forward driving or "D" operating mode, and the reverse driving or "R" operating mode.
Figure 4:
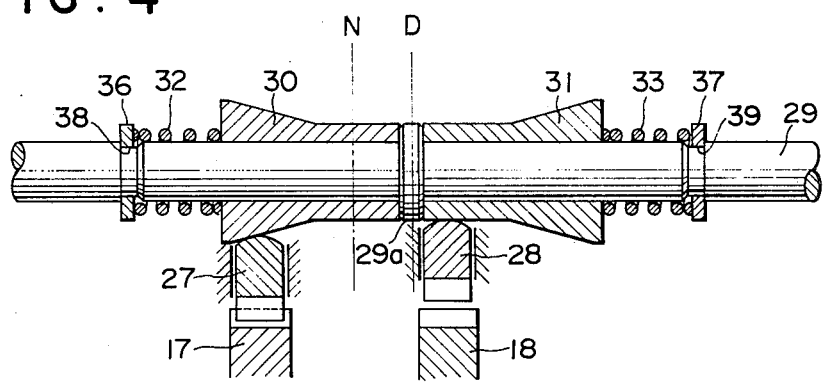
Figure 5:
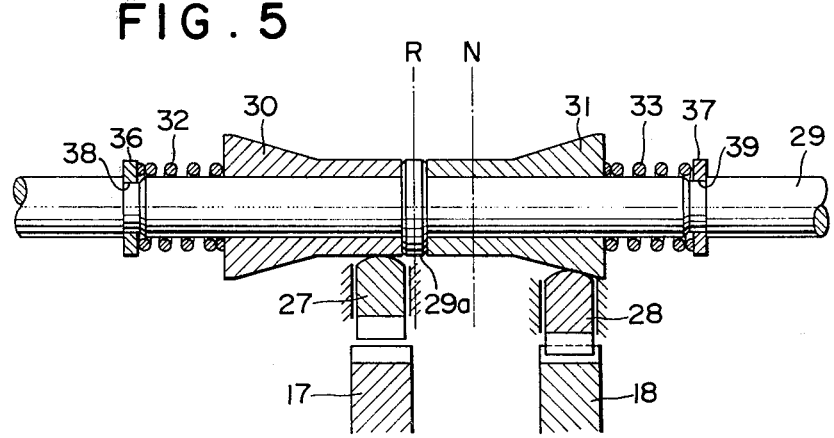

FIGS. 3, 4, and 5 are sectional illustrations of the construction of the first and second mechanical brakes in a second embodiment of the transmission of the present invention, which, apart from these brakes, is similar to the basic structure shown in FIG. 1. In this embodiment, the means to prevent rotation of the spline wheels 17 and 18 in the basic embodiment shown in FIG. 1 is somewhat elaborated. In this embodiment, these mechanical brakes are formed of pawls 27 and 28 which are adapted to slide in holes formed in the housing 4 in such a manner as to be able to engage with the teeth of the spline wheels 17 and 18 of the mechanical brakes 8 and 9 respectively. These pawls are biased upwards in the figure by biasing means such as springs which are not shown in the figure. A shift rod 29, which moves sideways in the figure, corresponds to the shift element 19 in the basic structure which is shown in FIG. 1. This shift rod 29 is shifted by an operating manual shift lever which is not shown in the figure, like the shift element 19 of the structure shown in FIG. 1. The shift rod 29 is formed with a central flange 29a, and on the shift rod 29 slide cams 30 and 31, as seen in the figure, which normally abut the central flange 29a, and which are biased up against this central flange 29a by springs 32 and 33 respectively. These springs 32 and 33 bear, at their other ends, against stop members 36 and 37, which are fitted into grooves 38 and 39 in the shift rod 29. The force of the springs 32 and 33 ensures that, provided force greater than a certain trigger force is not applied to push either of the cams 30 or 31 away from the central flange 29a, these cams remain in the same position, contacting this central flange 29a.

This shift rod 29 works in a very similar manner to the shift element 19 shown in the basic embodiment of FIG. 1. That is, when the shift rod 29 is in the central, or neutral "N" position with the central flange 29a being aligned with the line N in the figure, both of the pawls 27 and 28 are in the upward positions in the figure, and do not engage with their respective spline wheels 17 and 18. Therefore, these spline wheels are free to turn, and this corresponds to the neutral state of the transmission of FIG. 1. This state is illustrated in FIG. 3.

However, when the shift rod 29 is forced by the operation of the operating manual shift lever rightwards in the figure, to the position shown in FIG. 4, then it is in the forward driving or "D" position, and the cam 30 pushes the pawl 27 downwards in the figure against the force of its biasing means, so that this pawl 27 engages with its spline wheel 17, and locks this spline wheel 17 with respect to the transmission casing 4. Meanwhile the spline wheel 18 is left free. This position corresponds to the position in the general structure shown in FIG. 1, when the first mechanical brake 8 is engaged. In this position, the transmission provides forwards driving.

Further, when the shift rod 29 is forced by the operation of the operating manual shift lever leftwards in the figure, to the position shown in FIG. 5, then it is in the reverse driving or "R" position, and then the cam 31 pushes the pawl 28 downwards in the figure against the force of its biasing means, so that this pawl 28 engages with its spline wheel 18, and locks this spline wheel 18 with respect to the transmission casing 4. Meanwhile the spline wheel 17 is left free to turn. This position corresponds to the position shown in the general structure shown in FIG. 1, when the second mechanical brake 9 is engaged. In this position, the transmission provides backwards driving.

The biasing means on the pawls 27 and 28 ensures that, when either of these pawls is not positively driven downwards by its respective cam 30 or 31, it is in the upwards position, and does not lock its respective spline wheel 17 or 18.

It is an important point of this embodiment that, by the provision of the springs 32 and 33, and by the biased movability of the cams 30 and 31 along the shift rod 29, the operation of this transmission is much facilitated. This is because in the operation of the transmission of the present invention the shift range is generally only shifted when the vehicle is at rest, and the electric motor 1 is de-energized, and accordingly no parts in the transmission are moving. It may therefore happen that, when the operating manual shift lever is shifted from, for example, the neutral or "N" position to the forward driving or "D" position, the pawl 27 will not properly engage with the teeth of the spline wheel 17, if their alignment is not correct. In the basic embodiment illustrated in FIG. 1, the teeth of the shift element 19 merely jam up against the teeth of the spline wheel 17, and no further movement of the shift element 19 is possible, and therefore it is not possible to push the operating manual shift lever fully home into the forward driving or "D" position. Therefore, the operation of the transmission is made much more inconvenient. Further, there is a possibility that a careless vehicle operator may hurriedly force the operating manual shift lever fully home into the "D" position, and thereby damage the mechanism. A real risk of such damage exists. Similar considerations exist for the shift from neutral or "N" range into reverse driving or "R" range. However, in the embodiment illustrated in FIGS. 3, 4, and 5, this problem does not exist. When the operating manual shift lever is forced positively into, for example, the drive or "D" position from the neutral or "N" position, and when the pawl 27, which is thereby driven downwards in the figure, is unable to enter between the teeth of the spline wheel 17, due to the misalignment between the pawl and the teeth of this spline wheel 17, the cam 30 moves leftwards in the figure relative to the shift rod 29, while compressing the spring 32, and thus the rightwards movement of the shift element 29 is accomodated, without full movement of the pawl 27 downwards, until full shift movement of the operating manual shift lever is accomplished. Of course, as soon as the electric motor 1 is energized, and/or the vehicle moves slightly, the pawl 27 will engage automatically with the spline wheel 17, under the effect of the urging of the spring 32, when a gap between the teeth of the spline wheel 17 comes into register with the pawl 27. Similar considerations hold in this embodiment for the shift from neutral or "N" position into reverse driving or "R" position.

Figure 6:
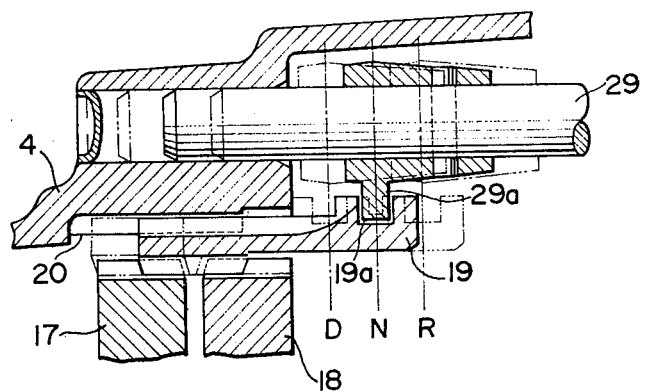
FIGS. 6 and 7 are views similar to FIGS. 3, 4, and 5, showing parts of the mechanical brakes of two other embodiments of the present invention, which are able to operate in a transmissionlocked parking or "P" mode (but not in a neutral or "N" mode), and which are in that "P" mode; the first of these embodiments, illustrated in FIG. 6, being similar to the embodiment of FIG. 1, and the second, illustrated in FIG. 7, being similar to the embodiment of FIGS. 4, 5, and 6.

FIG. 6 is a sectional diagram showing the construction of the first and second mechanical brakes in a third embodiment of the transmission of the present invention, which, apart from these brakes, is similar to the basic structure shown in FIG. 1. In FIG. 6, the portions indicated as 17, 18, and 19 correspond to the spline wheels 17 and 18, and the shift element 19, of FIG. 1, respectively. The shift element 19 is driven leftwards and rightwards in the figure by the movement of the shift rod 29 by a pawl 29a formed at a portion of the shift rod 29 engaging with a groove 19a formed in a portion of the shift element 19. The shift rod 29 is actuated by a operating manual shift lever not shown in the figure. In this case, however, when the shift element 19 is set in the central position, by positioning the groove 19a in alignment with line N in the figure, it is engaged with both of the spline wheels 17 and 18, as opposed to the embodiment of FIG. 1, wherein the shift element 19 is engaged with neither of the spline wheels 17 and 18 at its intermediate position. Because of the construction of the Ravigneaux planetary gear train and so forth, therefore, when the operating manual shift lever is in the central position, and thus the shift element 19 is in the central position, both of the spline wheels 17 and 18 are locked with respect to the transmission casing 4, and thus the transmission assumes a locked state. This effect is similar to the operation of a conventional transmission when the shift lever is set to the parking or "P" position.

Further, as in the previous embodiments, when the shift element 19 is shifted in the leftward direction in the figure, so that the groove 19a is put into the driving or "D" position, the teeth of the shift element 19 disengage from the spline wheel 18, but do not disengage from the spline wheel 17. Thus only the spline wheel 17 is engaged with the shift element 19, and hence only this spline wheel 17 is prevented from turning relative to the transmission case 4. Thus, as in the previous embodiments, the transmission is put into the forward driving or "D" mode. Conversely, on the other hand, when the shift element 19 is shifted in the rightward direction in the figure, so that the groove 19a is put into the reverse driving or "R" position, the teeth of the shift element 19 disengage from the spline wheel 17, but do not disengage from the spline wheel 18. Thus only the spline wheel 18 is engaged with the shift element 19, and hence only this spline wheel 18 is prevented from turning relative to the transmission case 4. Thus, as in the previous embodiments, the transmission is put into the reverse driving or "R" mode. Therefore, in both these cases, the operations of selecting forwards and reverse gears are performed as explained in relation to FIGS. 1 and 2.

Figure 7:
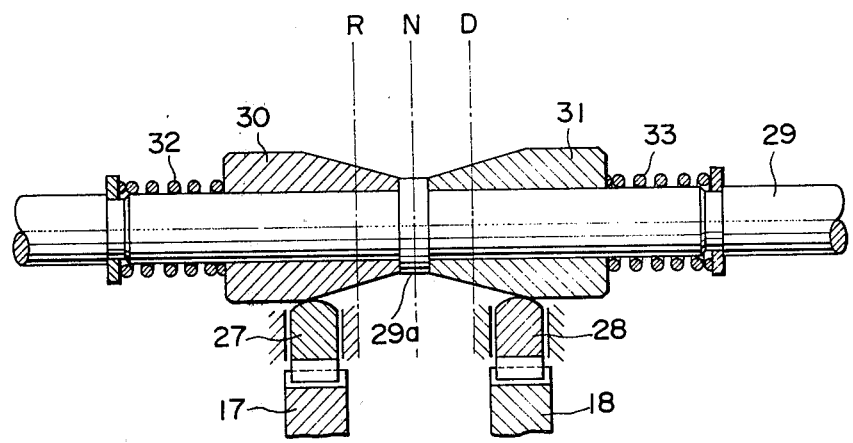

FIG. 7 is a sectional diagram showing the construction of the first and second mechanical brakes in a fourth embodiment of the transmission of the present invention, in which, as in the embodiment shown in FIG. 6, when the shift rod 29 is set in the central position, both the spline wheels are locked with respect to the casing, and hence the transmission is in the parking or "P" mode. However, in this embodiment, the construction is modified to the construction shown in FIGS. 3, 4, and 5. The portions of FIG. 7 which correspond to portions shown in FIGS. 3 to 5 will be indicated by the same reference numbers. In brief, the position shown in FIG. 7 is the one with the shift rod 29 in the central position, and in this state as seen in the diagram both the pawls 27 and 28 are engaged with the spline wheels 17 and 18. Thus the transmission is locked, as explained above. If the shift rod 29 is moved from this position to the right in the diagram, the pawl 28 becomes disengaged from the spline wheel 18, and a state equivalent to that shown in FIG. 4 is achieved. Thus the vehicle is in forward driving, or "D", mode. Conversely, if the shift rod 29 is moved from the position shown in FIG. 7 to the left in the figure, the pawl 27 becomes disengaged from the spline wheel 17, and a state equivalent to that shown in FIG. 5 is achieved, and the vehicle is put into reverse driving, or "R," mode.

It will be clear to a man of ordinary skill in the transmission arts, based upon the above remarks, that it would be possible, by further modifying the structure of these first and second mechanical clutches, and their sequence of actuation, to provide a transmission which, as well as forward driving or "D" mode and reverse driving or "R" mode, provides both a parking or "P" mode in which the transmission is locked and a neutral or "N" mode in which the transmission is free. This would be done by arranging that both of the first and second mechanical brakes could together be either engaged or disengaged, as well as either being engaged separately while the other was disengaged. This sort of transmission must therefore be understood to be within the scope of the present invention.

Thus according to the present invention the need for an oil pump to provide supply of oil even during temporary halt of the vehicle is eliminated, and in a vehicle with an electric driving motor this means that the need for an auxiliary motor to drive the oil pump is eliminated. Furthermore, an automatic transmission of simple and efficient structure is achieved, which allows selection to be performed between two forward gears automatically according to running conditions, and selection to be made between forward and reverse gears by a manual operating device.

Various modifications and omissions of the form and the content of the present invention, without departing from its spirit, will be possible for a man skilled in the art thereof. For example, the present invention is not to be limited solely to use with electric vehicles, but may be used with vehicles powered by steam, for instance. Therefore, although the present invention has been shown and described with reference to some preferred embodiments thereof, and with reference to the drawings, it should be understood that these illustrative embodiments and drawings have been given for the purposes of explanation only, and are by no means intended to limit the scope of the invention, or of the protection sought to be given to the present invention by Letters Patent, which are intended to be defined solely by the appended claims.

I claim:
1. A transmission comprising:
   a casing;
   an input shaft;
   an output shaft;
   an oil pump driven by said output shaft;
   an oil pressure clutch operated by the oil pressure output from the oil pump;
   a one-way clutch;
   first and second manually operated mechanical brakes selectively engageable independent of oil pressure to place said transmission in forward, reverse or neutral condition, said first and second mechanical brakes comprising first and second spline wheels, respectively;
   a shift element guide member attached to the casing and a shift element which slides in said shift element guide member, said shift element selectively engageable with the teeth of the spline wheels to prevent the engaged spline wheel from turning;
   a Ravigneaux-type planetary gear train, comprising:
   a first sun gear coupled to said input shaft;
   a second sun gear selectively coupled to said casing through a series connection of said one-way clutch and said first mechanical brake and coupled to said input shaft through said oil pressure clutch when oil pressure from said oil pump achieves a predetermined level due to rotation of said output shaft;
   first and second planetary pinions being mutually meshed and being respectively meshed with said first and second sun gears;
   a carrier supporting said first and second planetary pinions and being coupled to said output shaft; and
   a ring gear meshed with said second planetary pinion and being selectively coupled to said casing through said second mechanical brake.

2. A transmission as in claim 1, wherein the shift element has a position in which it engages the teeth of the first spline wheel but not the teeth of the second spline wheel, a position in which it engages the teeth of the second spline wheel but not the teeth of the first spline wheel, and a position in which it engages the teeth of both of the spline wheels.

* * * * *